No. 857,651. PATENTED JUNE 25, 1907.
F. MÖLLER.
BRAKE AND BUFFER.
APPLICATION FILED FEB. 1, 1907.
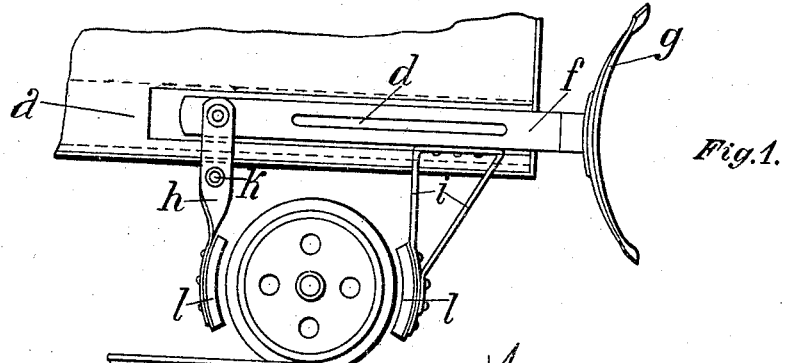
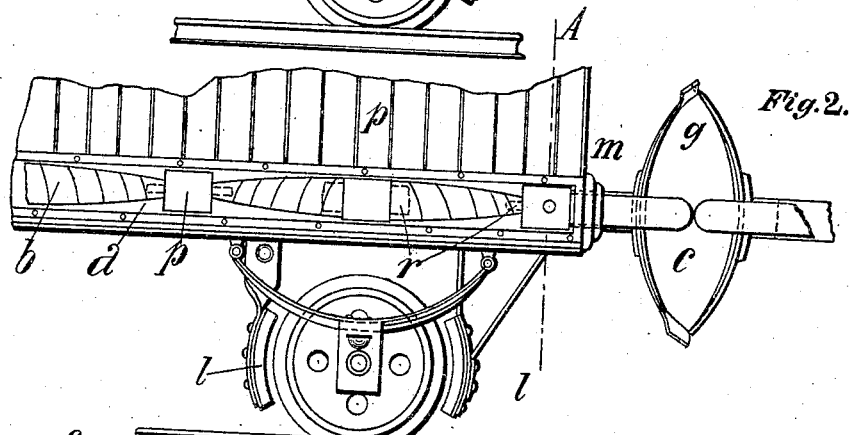
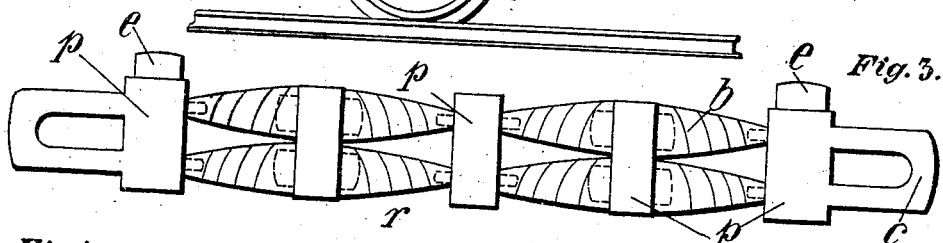
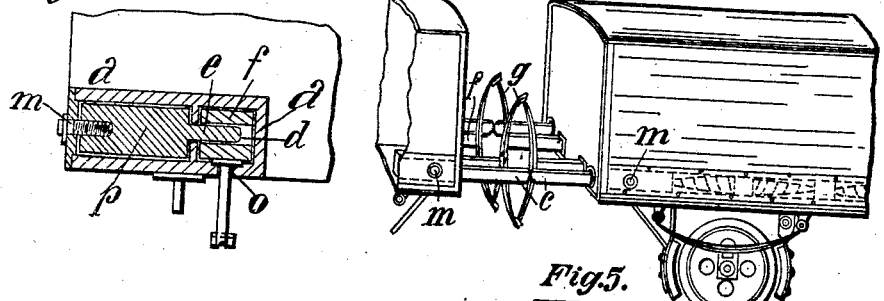
Witnesses:
Franz Krause
Wilhelm Klink
Inventor:
F. Möller

UNITED STATES PATENT OFFICE.

FRITZ MÖLLER, OF HAMBURG, GERMANY.

BRAKE AND BUFFER.

No. 857,651.  Specification of Letters Patent.  Patented June 25, 1907.

Application filed February 1, 1907. Serial No. 355,336.

*To all whom it may concern:*

Be it known that I, FRITZ MÖLLER, a subject of the King of Denmark, and a resident of No. 14 Turnerstrasse, Hamburg, Germany, have invented certain new and useful Improvements in and Relating to Brakes and Buffers of the Wagons of Railways, of which the following is a specification.

The present invention deals with a novelty, for the wagons or carriages of railways, by which a piling up of the wagons, in case of any collision, and also the resulting bouncings are avoided, so much so, that travelers would not feel the latter, and an extensive damage of the materials, wreck, and loss of life will be reduced to a minimum.

The novelty consists, in the main, of the springs which are slidably arranged in special hollow beams, fixed to the wagons, being connected with the relative buffers, and the plate springs, which are vertically arranged between the wagons respectively in connection with the slidable bars having brakes, so that in case of any unusual impact or pressure does occur between the wagons of a train, the latter springs would automatically brake the wheels, and the former springs would take away the force or shock of the impact.

The novelty is devised in such a manner that their respective parts are independently connected with the frame of the wagon whereby the disadvantages which exist in the former styles of construction are avoided.

The accompanying drawing represents a form of construction of the invention as applied to the wagons of railways.

Figure 1, shows the braking device which is operatively arranged with the buffer-springs respectively. Fig. 2, shows the buffer and the arrangement of the springs. Fig. 3, represents the buffer arrangement going through the wagon. Fig. 4, is a cross section view on the line A—B of Fig. 2. Fig. 5, is a perspective view of the novel arrangement arranged in two ordinary wagons.

In both the longitudinal sides of a wagon, hollow beams *a* are arranged having springs *b* removably attached to blocks *p* by the projections *r*, which are in the respective blocks, and enter the respective springs. The blocks *p*, situated near the ends of the wagon, are provided with projections *e* adapted to work freely in the grooves *d* of the respective bars *f* which are slidably arranged in the beams *a* behind the springs *b* or toward the inner side of the wagon. Under the said bars and in the hollow beams *a* there are grooves *o* (Fig. 4) in which the arms *i* of the brakes *l* can slide, and also the arm *h*, turnably connected at *k*, can swing inward upon the inward motion of the bars *f*, whereby the two brakes *l* operate on the wheels respectively. The projecting ends of the said bars are provided with plate springs *g*, rigidly connected, in such a manner that the ends of the springs in one wagon get into the shoe-like indentations which are in the ends of the springs of the opposite one, and the said springs are so situated, that they are actuated to move the bars only upon an unusual impact of the wagons of a train driving the buffers *c* beyond their limits, at which the bars *f* are pushed inward forcing the brakes *l* against the wheels, which pressure is relaxed at the moment the buffer springs *b* arrive to their usual positions, which action of the springs brings the said bars forward owing to the projections *e* in the blocks *p* catching at the ends of the grooves in the said bars; whereby the shock or concussion of the collision will be imperceptible in the wagons and the wagons will not be carried away on the line by force of the collision as the brakes are automatically applied on the wheels.

In order to prevent the buffer arrangement being driven out at the extreme end of a train, the blocks *p*, situated at the two ends of each wagon, are provided with screw bolts *m* which, on being tightened, hold the blocks against the sides of the beams from slipping; the above mentioned brakes may be arranged to work with the ordinary vacuum brakes.

The coupling of the wagons may be of the usual type. Owing to the special manner of construction, which conforms with the building of the wagons, the invention is adapted to be easily arranged or put in their places.

I claim;

In the improvements in and relating to buffers and brakes for the wagons of railways, the combination of hollow beams *a* with the wagons; springs *b* slidably arranged in the hollow of the said beams by connecting them with blocks *p* which having the projections *r* inserted in the interior of the springs whereby the latter is kept in position; the blocks *p* connected to the springs *b* near the ends of the wagon having a projection *e* adapted to slide in the groove of the bar *f*; the bars slidably arranged in the hollow of the said beams having arms $i$ with brakes $l$, and the arms $h$ having brakes $l$ turnably attached so that the bars are adapted to apply the said brakes on the respective wheels when the bars are pushed inward by the force of a collision; the plate springs $g$ rigidly fixed at the ends of the said bars, and the springs being provided with shoe-like indentations and corresponding plain surfaces at their ends so that the springs situated in one wagon with the plain surface at their ends, enter into the indentation of the springs situated in the opposite one; and the screw bolts $m$ provided at the ends of the wagon which are adapted to prevent the springs $b$ being driven out at the extreme end of a train when an unusual impact drives the buffers $c$ beyond their limits causing the bars $f$ to apply their brakes on the wheels, and the springs $b$ to take away the shock of the collision, substantially as shown and described.

FRITZ MÖLLER.

Witnesses:
   FRANZ PROUISE,
   WILHELM KLINK.